Figure 2:
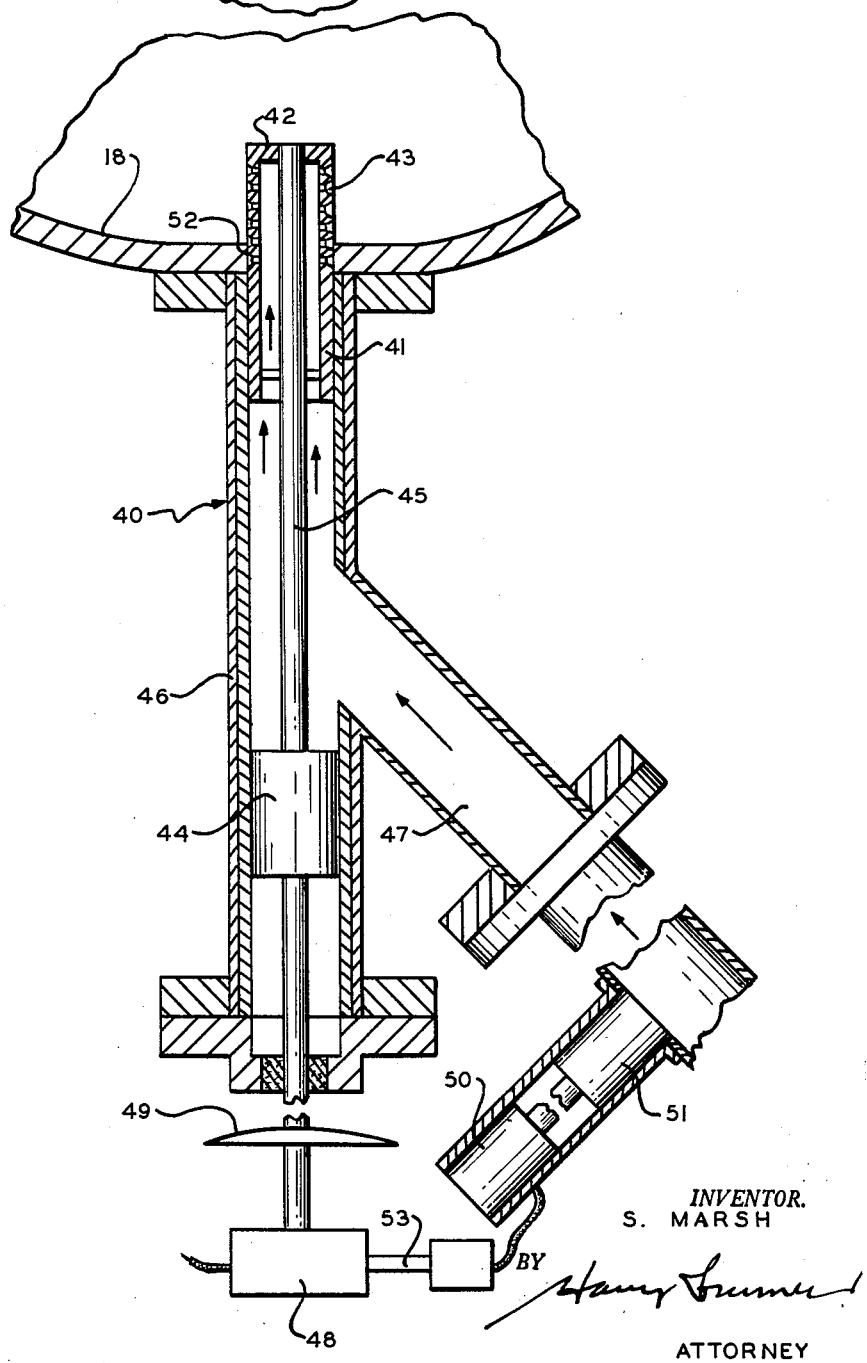

Nov. 24, 1964  S. MARSH  3,158,634
INEDIBLE RENDERING PROCESS
Filed Aug. 10, 1961  6 Sheets-Sheet 1
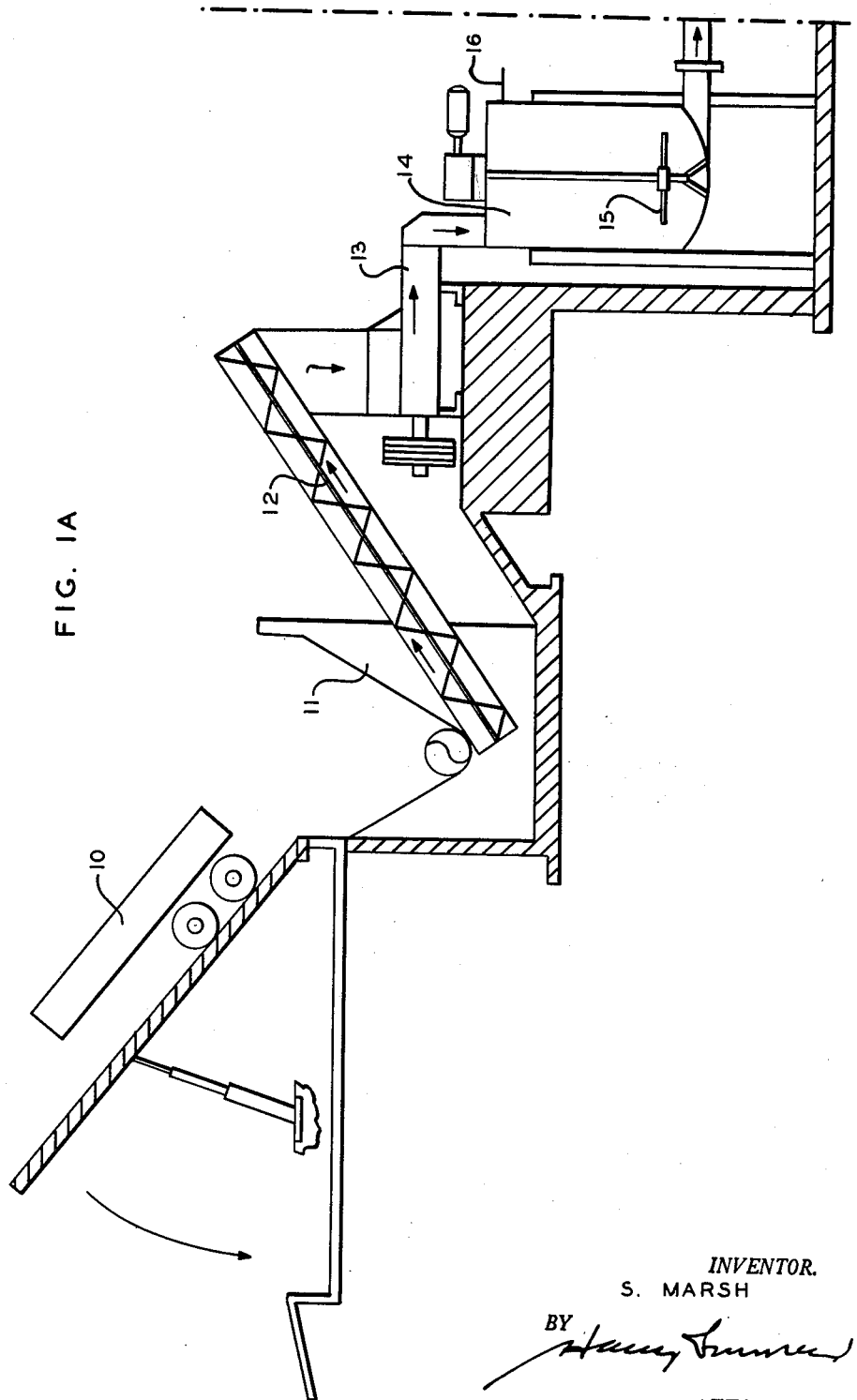
FIG. IA
INVENTOR.
S. MARSH
BY
ATTORNEY

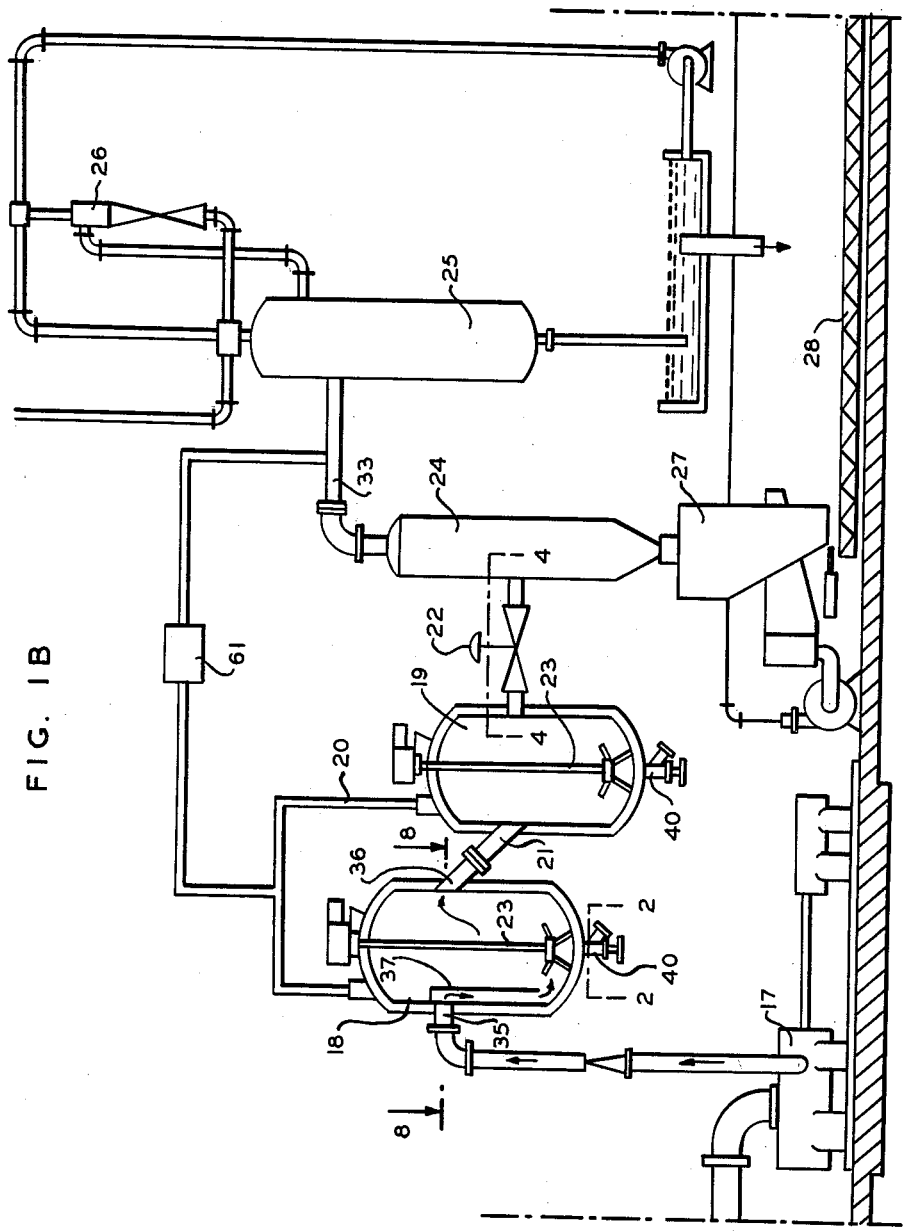
FIG. IB

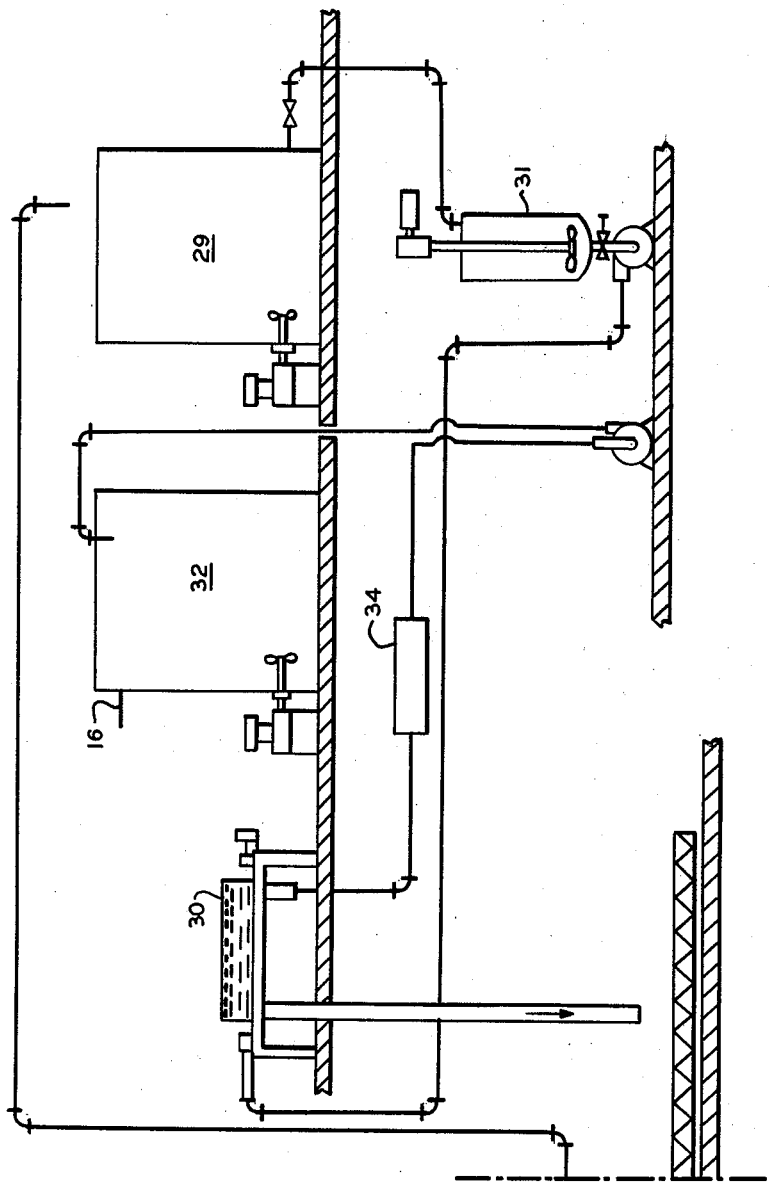

Nov. 24, 1964     S. MARSH     3,158,634
INEDIBLE RENDERING PROCESS
Filed Aug. 10, 1961     6 Sheets-Sheet 4

INVENTOR.
S. MARSH
BY
ATTORNEY

Nov. 24, 1964 S. MARSH 3,158,634
INEDIBLE RENDERING PROCESS
Filed Aug. 10, 1961 6 Sheets-Sheet 5

INVENTOR.
S. MARSH
BY
ATTORNEY

Nov. 24, 1964

S. MARSH 3,158,634

INEDIBLE RENDERING PROCESS

Filed Aug. 10, 1961

6 Sheets-Sheet 6

INVENTOR.
S. MARSH

BY

ATTORNEY

United States Patent Office 3,158,634
Patented Nov. 24, 1964

3,158,634
INEDIBLE RENDERING PROCESS
Sam Marsh, Newark, N.J., assignor to Marsh Associates, Newark, N.J., a corporation of New Jersey
Filed Aug. 10, 1961, Ser. No. 131,966
5 Claims. (Cl. 260—412.6)

This invention relates to the art of inedible rendering and more particularly to an improved rendering process which differs from the wet and dry rendering procedures of the prior art, obviating disadvantage of said procedures and constituting a major improvement thereover.

The meat packing industry has been plagued by the problem of economically and efficiently rendering inedible products such as the carcasses of animals, offal (all those portions of the animal not employed for human consumption such as the guts, bladder, hooves, feet, etc.) bone and fat. There is a substantial body of art on the rendering of animal waste products of this nature; the instant invention is directed to a novel, comprehensive, highly efficient and automatic rendering procedure and wherein the tallow, lard, fat, etc. present in such waste products are separated in relatively pure form from the proteinaceous cracklings residue.

The instant invention rendering procedure is illustrated in the description below and in the accompanying drawings addressed to those skilled in the art.

Figure 3:
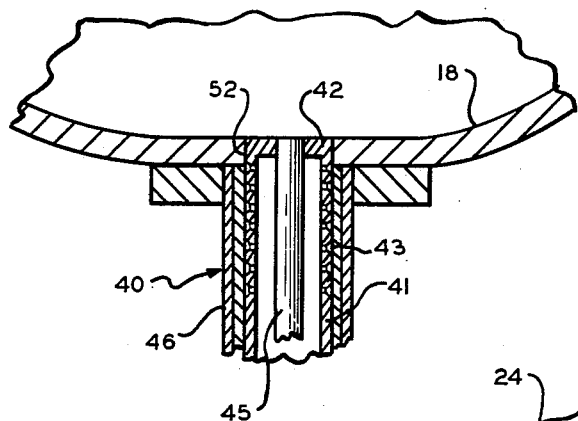
Figure 4:
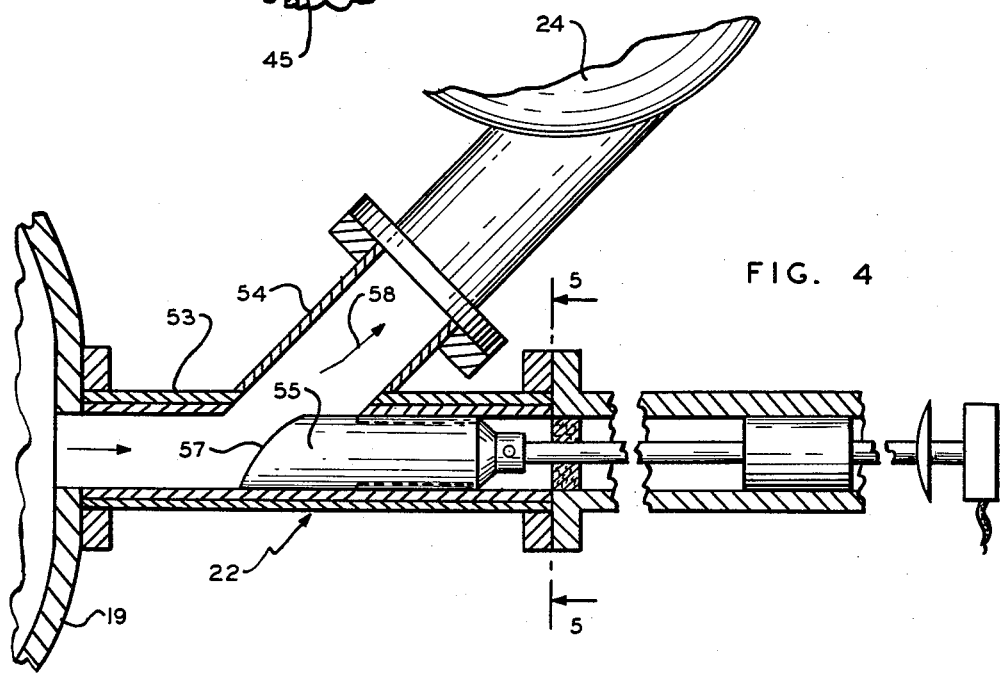
Figure 5:
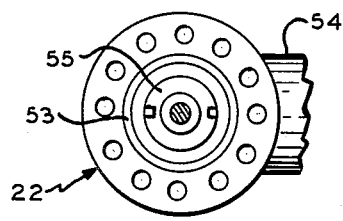
Figure 6:
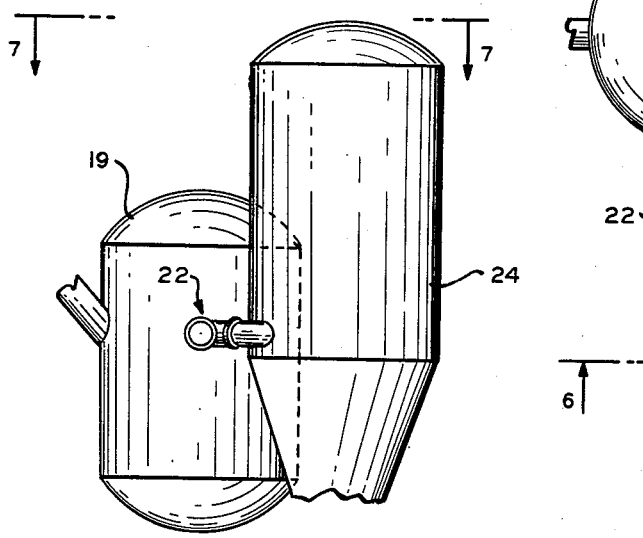
Figure 7:
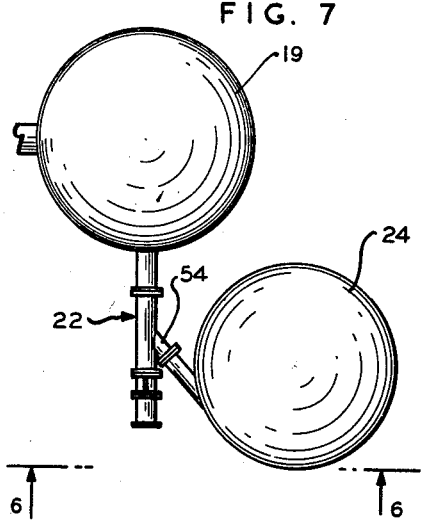
Figure 8:
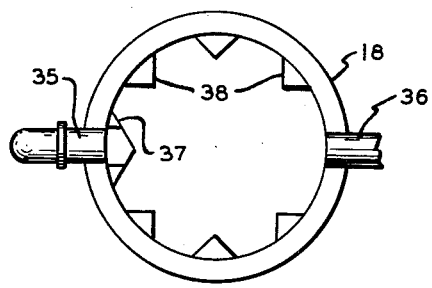
Figure 9:
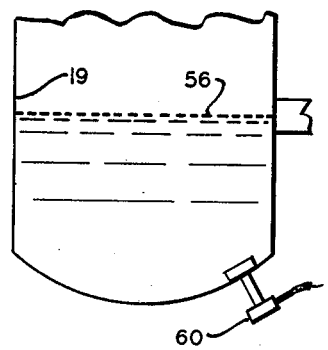

In the drawings wherein similar reference characters indicate like parts:

FIG. 1A is a schematic view of the material receiving point of the system of this invention, FIGS. 1B and 1C are schematic views of other points of the system, FIG. 2 is an enlarged sectional view taken at line 2—2 of FIG. 1B of steam injection means which may be used in carrying out the invention, FIG. 3 is a further fragmentary view thereof, FIG. 4 is an enlarged, partly sectional view of valve means which may be used in carrying out the invention, taken at line 4—4 of FIG. 1B, FIG. 5 is an end elevational view taken at line 5—5 of FIG. 4, FIG. 6 is a top plan view taken at line 6—6 of FIG. 7, FIG. 7 is a side elevational view taken at line 7—7 of FIG. 6, FIG. 8 is a horizontal sectional view taken at line 8—8 of FIG. 1B and FIG. 9 is a fragmentary schematic view of tank 19 and associated parts.

Referring now to FIGS. 1A, 1B and 1C wherein a system embodying the invention is illustrated, the entering animal material is discharged from a dumper 10, drums or other supply source surge hopper 2 which is of sufficient capacity to feed the entering material continuously, as by screw conveyor 12, directly to a suitable grinding or comminuting device 13 which, exemplarily may be a Rietz Mfg. Co. mill (P.B. 15 Prebreaker) wherein the feed stock is reduced to a particle size desired, for example, not to exceed 2 inches, reducing the feed stock to a size convenient for its being handled as a mixture or fluid suspension in tallow (which is recycled as the carrier) throughout the rendering operation; a one-two inch size may be convenient for processing.

The material dicharges from the prebreaker 13 into a premelt tank or kettle 14 which preferably has a series of stirrers—exemplified at 15 along with substantial quantities of tallow recycled as through conduit 16 from the clarified tallow storage tank (FIG. 1C) whereby the slurry or fluid mixture in tank 14 will contain between 5% to 80% of fresh solids, the agitating members 15 being provided to maintain tallow and pre-communited feed stock in fluid, pumpable state.

Essentially the temperature of the fluid mixture in this agitated kettle 14 is maintained in the range of 120° F.– 250° F. If some portion of the rendering is effected in kettle 14 at the higher part of the given temperature range, that will not affect the operation of the system. In any event, the desired temperature within the range of 120–250° F. is maintained by convenient expedients. The recycle tallow can be preheated and the kettle 14 may be externally (as by a steam jacket) and internally heated as desired with suitable controls to maintain the desired premelt temperature. As a point of preference, the premelt temperature may be maintained at the 200–210° F. level, as the highest level which permits atmospheric pressure operation and maximum amount of preheating consistent with same, but this temperature range may be varied to suit operating conditions and the actual residence time in the premelt tank or kettle 14 may similarly be varied to suit operating conditions to provide a preheated fluid mixture or slurry for subsequent rendering which is continuously fed from premelt tank 14 through a suitable pump 17 (e.g. a Dean Brothers Magma Pump) which serves to pressurize and force the fluid mixture into a reactor zone such as into the first of a pair of reactors 18 and 19 wherein the fluid mixture is rendered under a pressure of at least 50 p.s.i.a., preferably within the range of 50–175 pounds per square inch absolute, and at a temperature of at least 250° F. —preferably 250°–350° F. The pressure and temperature conditions at which reactor (18, 19) is maintained are contingent upon the type of raw stock being fed to the system. This reactor is shown jacketed and also containing a live steam injection valve arrangement which maintains internal pressures at the desired pressure and temperature. Reactors 18 and 19 (which preferably are identical and of the design described herein), may be a single larger reactor capable of withstanding the intended pressure and temperature, the important reaction zone characteristic for the proper practice of the instant invention being its operation to render a fluid tallow mixture under an absolute pressure of at least 50 pounds per square inch at a temperature of at least 250° F. with a sufficient volumetric capacity to provide an appropriate average residence time, such as of from one to eight minutes, for the materials being rendered. The preferred residence time would be generally inverse to the pressures and temperature actually employed. By the instant invention sufficient and automatically controlled and regulated heat is assured in the reaction zone to effect the desired rendering, without overheating and scorching the tallow or the material being rendered, or underheating and thereby failing to completely render. With a large volume reactor and the moderate holding or residence time range given above, it is possible to add enough heat by any of several expedients; both direct and indirect heating are preferably concurrently employed. The conjoint empolyment of the premelt kettle or tank 14 and the reactor vessels 18, 19 provides an advantageous system and highly efficient rendering unit, the premelt tank assuring adequate preheating of the feed stock from ambient temperature up to over 200° F., which is a large part of the heat required for the system as a whole. The reactor heating system may then heat the feed stock to the balance of the temperature rise desired for rendering without heating or scorching problems. The large holding capacity of the reactor alluded to also facilitates heating inasmuch as at any time the reactor vessel 18 is already at operational temperatures and only a small portion of the contents therein are freshly added material.

A suitable venting arrangement may be provided (as at 20, FIG. 1), so that the same pressure will exist in reactor vessels 18 and 19 to remove non-condensibles, e.g. nitrogen, and organic decomposition products generally such as methane, and $CO_2$, evolved in the course of the rendering.

The material which is pumped into the first reactor 18 ultimately flows therefrom into the connected reactor 19, the latter being provided to permit additional holding time if required for all bone feed or difficulty digestable feed and suitable valve and conduit means may be provided for eliminating one tank in the event of malfunctioning.

The system, by way of example, may be rated at approximately 125 gallons per minute feed into the rendering unit with an operating level capacity at overflow of approximately 1200 gallons in the tanks 18 and 19 (each may have the same capacity) so that a holding time would be about approximately ten minutes, depending on the heaviness of the slurry and amount and contents thereof. The temperature would likewise be regulated depending upon the material which would overflow from reactor 18 as through a ten inch overflow line 21 into reactor 19 which can serve either for additional rendering should that be required or as surge capacity for the rendered material prior to the step of flashing to atmospheric pressure; suitable stirrers 23 may be provided in reactors 18, 19. The rendered effluent leaves the rendering reactor vessel system 18, 19 by way of a throttling or flash valve schematically shown at 22 of FIG. 1A, and passes directly to a flash chamber 24 operated at or below atmospheric pressure. For purposes of the process as a whole any flash or throttling valve construction and any flash chamber of a suitable design may be employed such as will reduce the pressure on the rendered effluent in a manner which allows for continuous discharge from the rendering reaction zone; they may be of the special design below described, peculiarly adapted to the instant process.

The effluent entering flash chamber 24 self-cools down to an equilibrium temperature e.g. 200–212° F. During the course of this self-cooling a significant quantity of water is thermodynamically flashed off as water vapor e.g. substantial part of the stem directly added at reactors 18, 19, and a suitable condenser system such as tank and water jet valves 25, 26. Steam and non-condensibles from the flash off chamber pass as through conduit 33 to a barometric condenser such as a Schutte & Koerting system which condenses the steam to water and entrains and dissolves the non-condensible odors and send them to the sewer, a slight negative across the system being generated by the Schutte & Koerting water barometric jet 26 which may be of the high capacity low vacuum type, for example.

The self-rendered effluent settling by gravity flow to the bottom of flash chamber 24 is a liquid suspension or slurry. The solids or cracklings constituents are removed directly from the fluid by way of suitable screening elements 27 such as a De Laval circular vibrating screen which removes the solids from the water tallow mixture containing a small percentage of fines or solids. They are directly removed from the system as the cracklings product exemplarily being shown as taken off through a screw conveyor 27.

The liquid portion of the rendered reactor effluent is pumped to a conventional tallow recovery and clarifier system 29, the normally accepted treatment in the industry being the addition of approximately 3% by weight of the tallow of a 10% tri- or disodium phosphate solution. This can vary within limits depending upon the quality of the crude material received in the slurry tank. The phosphate treated material is then fed to a desludger such as a De Laval desludger 30 which separates the coagulated fines from the water tallow mixture. The holding time in tank 31 is sufficient for complete reaction and coagulation. Desludger 30 removes the fine cracklings product capable of passing through the interstices of screen members 27 and centrifugal separators to separate the tallow from the water in the mixtures. The desludger 30 may be a De Laval horizontal centrifuge which may be visualized as a large cylinder that is spinning—the inside of which is hollow and contains a screw conveyer running at a slightly different speed; due to the differences in densities of the two phases, one goes to the outside and the other goes to the inside, the solids being picked up by the screw and transferred to one end of the machine while the liquid is being transferred to the other. If desired a phosphate treating step 31 may be inserted into the system. The water tallow effluent may then be fed to a De Laval or Titan purifier which separates the finished tallow and remove the water. The tallow product ultimately is sent to tallow storage tanks 32 from which (as by conduit 16) a portion may be removed and directed back to the premelt tank 15 (FIG. 1A) for recycling.

Where, as in FIG. 1B, the inlet and outlet ports 35, 36 of the reactor 18 are located substantially at diametrically opposed points, a plate 37 (see also FIG. 8) may be provided in said tank spaced from the inner wall of the tank and extending in overlying relation to the inlet port and to substantially the bottom of the tank in spaced relation to the inner wall of the tank and thus defining therewith a conduit for the material entering the tank through inlet port 35 and directing the same to the bottom of the tank. Reactor 18 may be further provided with V-shaped plates 38 secured to the inner wall of the tank to deflect the material in the tank from the wall thereof, preventing scorching and direct contact. The reaction zone tanks 18, 19 may be further provided with means for injection of steam directly thereinto automatically and to the degree required to maintain pressure and temperature operating conditions therein within previously determined, desired ranges. For this purpose a Foxboro Recorder Temperature Controller may be provided including (FIG. 2) a sensor unit 39 to sense operating conditions therein and thus control valve 40. The principle of this valve is such that upon steam demand the inner piston, which is perforate, rises up into the tank proper and discharges live steam such as one rated to approximately eight to nine thousand pounds of steam per hour. When temperature and pressure requirements are met as determined by the recorder controller 39, the piston retracts into the valve body itself, eliminating completely the danger of orifice or perforate opening blocks—pitfall in the addition of steam to slurries of this type. The valve includes an upper piston 41 (FIG. 2) whose end 42 is closed, while the sides of the piston 41 are perforate as noted at 43. A lower piston 44 is connected thereto in spaced relation by shaft 45, the pistons operating within the cylinder 46 secured to the bottom of tank 18. Steam is supplied to cylinder 46 from a suitable source preferably tangent thereto as at 47; piston shaft 45 in turn, is controlled by the Foxboro Recorder Temperature Controller 48. When the Foxboro Recorder Controller 48 senses need for steam or for an increase in temperature, the solenoid 50 opens retracting valve 51 of steam port, steam flows to cylinder 46 and immediately exerts pressure. Diaphragm 49 forces the piston 41 up into the tank. The steam shoots out—temperature is attained—the instrument 48 senses that no more steam is needed, diaphragm 49 retracts piston 43 and closes the opening 52 shuts the solenoid 50 whereupon valve 51 closes port 47 through this interlocking electrical circuit 53. The valve 22 between the reactor zone 18, 19 and flashing chamber 24 is shown in FIG. 4 as such as to provide for tangential entry of the material from tank 19 to the flashing chamber. The valve comprises a main cylinder 53 opening to tank 19 and port 54 tangential thereto and opening into flash chamber 24. Piston 55 is reciprocated through solenoid or other means 56 actuated responsive to the level (56 fluid level, FIG. 9) of liquid in tank 19 so that when that level rises above a predetermined point the piston will be retracted, opening the port 54 to the flash chamber 24 and allowing the material to flow from the tank 19 thereinto; when the fluid level in tank 19 falls, the piston is actuated to close the port. The piston 55 may have a rounded end 56 facing the flow of material from tank 19 as indicated by the arrows 57 to deflect solids. The valve 22 through port 54 ties in tangentially to the flashing chamber 24 so that the material enters the flashing chamber tangentially and swirls around. The sensing means for actuating the height of liquid level 56 in the tank 19 may be a Foxboro Recording Controller 60 (FIG. 9) which may be in the tank 19 at the bottom set to maintain the pool in tank 19 at the desired level, thus to actuate the valve to that end automatically.

I have shown in the accompanying drawings and described herein preferred forms of my invention illustrative of the numerous modifications which may be made by those skilled in the art pursuant to the invention and in utilizing its benefits and various applications, within the scope and purview of this invention.

The foregoing disclosure will enable those skilled in this art to utilize the invention, with modifications where required; such uses shall be deemed within the scope and purview thereof. For example, pressure in the reactors 18, 19 may be from full vacuum to 150 pounds sq. inch. Likewise other changes in the process and apparatus may be made by those skilled in the art within the scope and purview of the invention as set forth in the disclosure and claims hereof. Likewise, it will be understood that the invention exemplified as to the rendering of animal products is equally applicable to the rendering of other animal and other products as the starting material deposited into hopper 11, such as proteinaceous materials of the vegetable, plant and marine categories such as peanuts, cottonseed, fish, corn, castor oil, etc.

Having thus described my invention, what I claim as new and desire to secure by Letters Patent is:

1. A rendering process for continuously rendering bone, fat, and offal animal matter including chunks of about two inches and less in size comprising the steps of:
   (1) preheating and simultaneously admixing said animal matter with recycle fat to form a processing fluid mixture containing from about 5 to 80 percent solids, said preheating being maintained at a temperature in the range of about 120° F. to 250° F.;
   (2) moving said fluid mixture into a pressurized reaction zone of a pressurized reaction zone of a large volume capacity and maintaining therein a substantial body of said fluid mixture under a pressure in the excess of about 50 p.s.i.a. and at a temperature of at least 250° F.;
   (3) pressure rendering said fluid mixture in said reaction zone in the presence of live steam for an average time period of from 1 to 10 minutes;
   (4) pressure flashing the reacted mixture from said pressurized reaction zone to an approximately atmospheric pressure zone whereby a portion of the associated water is removed from said fluid mixture;
   (5) separating the fat and remaining water in said fluid mixture from the solids in said fluid mixtures; and
   (6) recycling a portion of the processed fat to said admixing step.

2. A rendering process as defined in claim 1 wherein, said pressure flashing is controlled by the level of said body of fluid mixture in said pressurized reaction zone rising to a predetermined level within said pressurized reaction zone.

3. A rendering process as defined in claim 1, said process being rated at approximately 125 gallons per minute feed.

4. A rendering process as defined in claim 1, said process being rated at approximately 125 gallons per minute feed into said large volume capacity reactor and wherein the overflow of the reactor is approximately between 1200 and 2400 gallons.

5. A rendering process defined in claim 1, said process being rated at approximately 125 gallons per minute feed into said large volume capacity reactor and wherein said live steam is discharged at a rate of approximately eight to nine thousand pounds of steam per hour.

References Cited in the file of this patent

UNITED STATES PATENTS

| | | |
|---|---|---|
| 1,654,506 | McTavish | Dec. 27, 1927 |
| 1,966,181 | Lowry | July 10, 1934 |
| 2,551,042 | Nyrop | May 1, 1951 |
| 2,580,049 | Sifferd et al. | Dec. 25, 1951 |
| 2,673,790 | Illsley | Mar. 30, 1954 |
| 2,742,488 | Dufault | Apr. 17, 1956 |
| 2,745,856 | Dayen et al. | May 15, 1956 |
| 2,748,152 | Siffered et al. | May 29, 1956 |
| 2,911,421 | Greenfield | Nov. 3, 1959 |
| 3,020,160 | Downing et al. | Feb. 6, 1962 |
| 3,025,315 | Krumm et al. | Mar. 13, 1962 |